United States Patent
Dautartas et al.

(10) Patent No.: US 6,912,345 B2
(45) Date of Patent: Jun. 28, 2005

(54) TAPERED OPTICAL FIBER FOR COUPLING TO DIFFUSED OPTICAL WAVEGUIDES

(75) Inventors: Mindaugas F. Dautartas, Blacksburg, VA (US); Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/113,817

(22) Filed: Mar. 28, 2002

(65) Prior Publication Data
US 2003/0068149 A1 Apr. 10, 2003

Related U.S. Application Data

(60) Provisional application No. 60/280,657, filed on Mar. 30, 2001.

(51) Int. Cl.[7] .................................................. G02B 6/26
(52) U.S. Cl. .............................. 385/43; 385/49; 385/50
(58) Field of Search ............................... 385/43, 49, 50

(56) References Cited

U.S. PATENT DOCUMENTS

| | | |
|---|---|---|
| 3,984,173 A | 10/1976 | Shaw |
| 4,066,482 A | 1/1978 | Shaw |
| 4,097,118 A | 6/1978 | Hammer |
| 4,296,143 A | 10/1981 | Franken et al. |
| 4,370,021 A | 1/1983 | Khoe et al. |
| 4,384,038 A | 5/1983 | Khoe et al. |
| 4,415,227 A | 11/1983 | Unger |
| 4,426,440 A | 1/1984 | Thompson |
| 4,524,127 A | 6/1985 | Kane |
| 4,585,299 A | 4/1986 | Strain |
| 4,678,267 A | 7/1987 | Burns et al. |
| 4,688,884 A | 8/1987 | Scifres et al. |
| 4,773,720 A | 9/1988 | Hammer |
| 4,789,642 A | 12/1988 | Lorenzo et al. |
| 4,795,228 A * | 1/1989 | Schneider .................... 385/31 |
| 4,886,538 A | 12/1989 | Mahapatra |
| 4,927,781 A | 5/1990 | Miller |
| 4,931,077 A | 6/1990 | Angenent et al. |
| 4,991,926 A | 2/1991 | Pavlath |
| 5,009,475 A | 4/1991 | Knudson |
| 5,018,809 A | 5/1991 | Shin et al. |

(Continued)

FOREIGN PATENT DOCUMENTS

| | | |
|---|---|---|
| EP | 0687925 | 12/1995 |
| WO | WO 97/42534 | 11/1997 |
| WO | WO 02/095453 | 11/2002 |
| WO | WO 03/050580 | 6/2003 |

OTHER PUBLICATIONS

I. F. Lealman, et al. "Tapered Active Layer Laser Device Performance and its Impact on Low Cost Optoelectronics", 4:00–4:30pm (Invited) EMGW2.2, pp. 11 and 12.

Y. Shani, et al. "Efficient coupling of a semiconductor laser to an optical fiber by means of a tapered waveguide on silicon", Appl. Phys. Lett. 55 (23) Dec. 4, 1989, pp. 2389–2391.

Spuhler, et al. "Very Short Planar Silica Spot–Size Converter." Journal of Lightwave Technology, vol. 16, No. 9, pp. 1681–1685, Sep. 1998.

Primary Examiner—Rodney Bovernick
Assistant Examiner—Sung Pak
(74) Attorney, Agent, or Firm—Jonathan D. Baskin; Niels Haun

(57) ABSTRACT

An optical fiber having an a core with a D-shape or an oval shape at an endface. The optical fiber tapers from a round, cylindrical section to the endface so that adiabatic mode transformation is provided. Preferably, the D-shape or oval shape is selected so that the optical fiber has a mode shape at its endface that matches the mode shape of a diffused waveguide.

18 Claims, 4 Drawing Sheets

U.S. PATENT DOCUMENTS

| | | |
|---|---|---|
| 5,057,022 A | 10/1991 | Miller |
| 5,071,216 A | 12/1991 | Sullivan |
| 5,078,516 A | 1/1992 | Kapon et al. |
| 5,135,590 A | 8/1992 | Basavanhally et al. |
| 5,142,596 A | 8/1992 | Mizuuchi et al. |
| 5,172,143 A | 12/1992 | Baude et al. |
| 5,208,882 A | 5/1993 | Strasser et al. |
| 5,265,177 A | 11/1993 | Cho et al. |
| 5,278,926 A | 1/1994 | Doussiere |
| 5,281,305 A | 1/1994 | Lee et al. |
| 5,351,323 A | 9/1994 | Miller et al. |
| 5,354,709 A | 10/1994 | Lorenzo et al. |
| 5,439,782 A | 8/1995 | Haemmerle et al. |
| 5,444,805 A | 8/1995 | Mayer |
| 5,456,797 A | 10/1995 | Weber et al. |
| 5,465,860 A | 11/1995 | Fujimoto et al. |
| 5,540,346 A | 7/1996 | Fujimoto et al. |
| 5,546,209 A | 8/1996 | Willner et al. |
| 5,576,149 A | 11/1996 | Yamamoto et al. |
| 5,629,999 A | 5/1997 | Henry et al. |
| 5,671,316 A * | 9/1997 | Yuhara et al. ............. 385/137 |
| 5,672,538 A | 9/1997 | Liaw et al. |
| 5,703,895 A | 12/1997 | Ghirardi et al. |
| 5,737,474 A | 4/1998 | Aoki et al. |
| 5,844,929 A | 12/1998 | Lealman et al. |
| 5,854,868 A | 12/1998 | Yoshimura et al. |
| 5,868,952 A | 2/1999 | Hatakeyama et al. |
| 5,940,557 A | 8/1999 | Harker |
| 5,953,477 A * | 9/1999 | Wach et al. ............. 385/115 |
| 5,966,617 A | 10/1999 | Ismail |
| 5,999,295 A | 12/1999 | Vowell et al. |
| 6,003,222 A | 12/1999 | Barbarossa |
| 6,037,189 A | 3/2000 | Goto |
| 6,108,478 A | 8/2000 | Harpin et al. |
| 6,197,656 B1 | 3/2001 | Adkisson et al. |
| 6,229,947 B1 | 5/2001 | Vawter et al. |
| 6,253,009 B1 | 6/2001 | Lestra et al. |
| 6,292,609 B1 | 9/2001 | Matsushima et al. |
| 6,317,445 B1 | 11/2001 | Coleman et al. |
| 6,396,984 B1 | 5/2002 | Cho et al. |
| 2003/0002793 A1 | 1/2003 | Dautartas |

* cited by examiner

US 6,912,345 B2

TAPERED OPTICAL FIBER FOR COUPLING TO DIFFUSED OPTICAL WAVEGUIDES

RELATED APPLICATIONS

The present application claims the benefit of provisional patent application 60/280,657 filed on Mar. 30, 2001 and which is incorporated herein by reference.

FIELD OF THE INVENTION

The present invention relates generally to fiber optics and optical waveguides. More specifically, the present invention relates to a shaped optical fiber for providing efficient optical coupling to a diffused optical waveguide.

BACKGROUND OF THE INVENTION

Diffused optical waveguides typically have a D-shape, and, hence, a D-shaped optical mode. A D-shaped optical mode does not couple efficiently to an optical fiber which has a circular optical mode.

SUMMARY

These objects and advantages are attained by an optical fiber having a shape that tapers from a conventional round shape, to a D-shape.

The above discussed need is addressed by an optical fiber including a) a cylindrical section; b) an endface wherein the optical fiber has a D-shape at the endface and c) a tapered section disposed between the cylindrical section and the endface, wherein the tapered section has a flat side disposed at an angel with respect to a fiber axis.

Additionally, an optical communications device is provided and includes a) a diffused optical waveguide and b) an optical fiber coupled to the diffused optical waveguide, wherein the optical fiber includes 1) a cylindrical section, 2) an endface wherein the optical fiber has a D-shape at the endface and 3) a tapered section disposed between the cylindrical section and the endface, wherein the tapered section has a flat side disposed at an angle with respect to a fiber axis.

Furthermore, an optical fiber is provided which includes a) a cylindrical section with a round cross-section, b) an endface wherein the optical fiber has a D-shape cross-section at the endface and c) a tapered section disposed between the cylindrical section and the endface, wherein the tapered section comprises a smooth transition between the cylindrical section and the D-shape.

The above discussed and other features and advantages of the present invention will be appreciated and understood by those skilled in the art from the following detailed description and drawings.

BRIEF DESCRIPTION OF THE DRAWINGS

The foregoing and other features and advantages of the present invention will be more fully understood from the following detailed description of the illustrative embodiments, taken in conjunction with the accompanying drawings in which.

DETAILED DESCRIPTION

Figure 1:
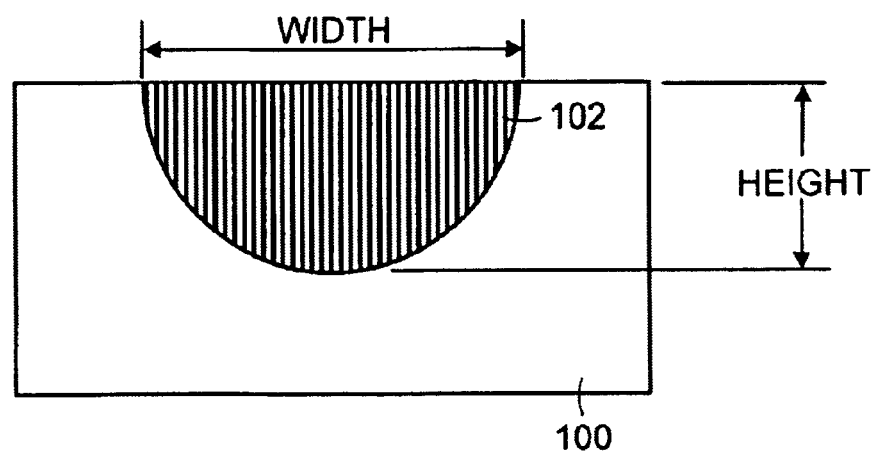
FIG. 1 is a cross-sectional view of a diffused waveguide, having a core with a D-shaped cross section.

The present invention provides fibers 104, 204 that have a reduced coupling loss when coupled to a D-shaped diffused waveguide 100. The optical fibers of the present invention may be compressed or polished so that they have an oval or D-shaped fiber core. Only the end portion 108 of the optical fiber 104 is compressed. The compressed area of the fiber 104 is tapered so that light in the fiber core 106 experiences a roughly adiabatic mode transformation. The remaining fiber core has a D-shape, which provides improved coupling to the diffused waveguide 100. In addition, the present disclosure also includes an embodiment where an optical fiber 204 is polished at an angle to remove a portion of fiber core 206. The remaining portion of fiber core 206 has a D-shape, which provides improved coupling to diffused waveguide 100.

Referring to FIG. 1, a diffused waveguide 100 having a core 102 with a D-shaped cross section is shown. Diffused waveguides 100 are commonly made in glass and lithium niobate, and coupling an optical fiber to diffused waveguide 100 typically produces a high loss connection. The loss is caused in part by a mismatch in mode shape between the optical fiber and diffused waveguide 100, because optical fibers typically have a circular mode shape, which does not couple efficiently to the D-shaped mode of a diffused waveguide 100. Moreover, a diffused waveguide core 102 typically has a width twice the height.

Figure 2:
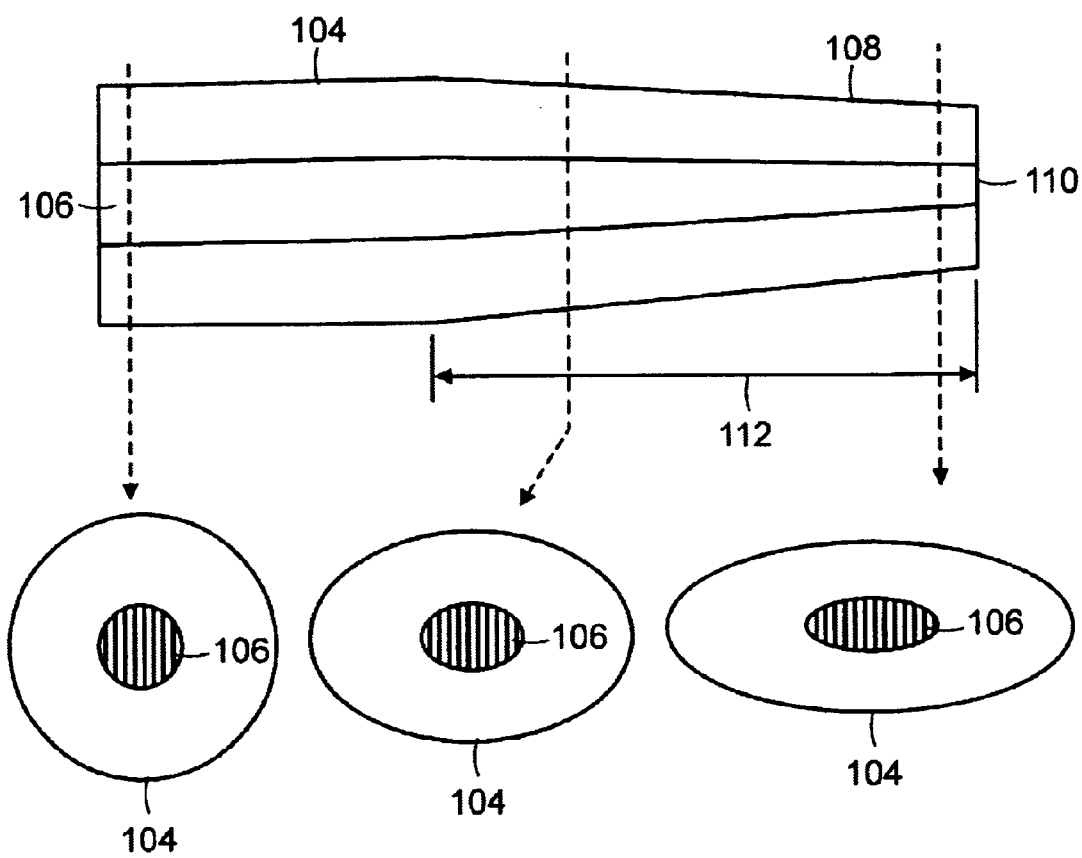
FIG. 2 is a side view with cross-sectional views of an optical fiber having a tapered, compressed end section, in accordance with a first embodiment.
Figure 3:
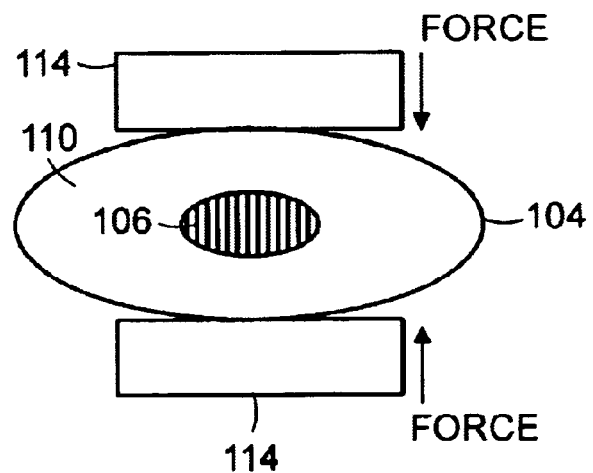
FIG. 3 is a cross-sectional front view of the optical fiber of FIG. 2.

Referring to FIG. 2 a side view and cross sectional views of optical fiber 104 having fiber core 106, a tapered, compressed end portion 108, and a fiber end face 10 are shown. The fiber end face 110 is shown being wider than it is tall and the long taper length 112 of end portion 108 provides for adiabatic mode transformation. The taper length 112 may be in the range of 100–10,000 microns, for example. The widened fiber core 106 advantageously provides for better coupling to a diffused waveguide 100. Furthermore, as shown in FIG. 3, optical fiber 104 having a widened fiber end face 110 may be made by plastically deforming optical fiber 104 by applying heat and pressure to optical fiber 104 via tools 114. The optical fiber 104 may be constructed of silica.

Figure 4:
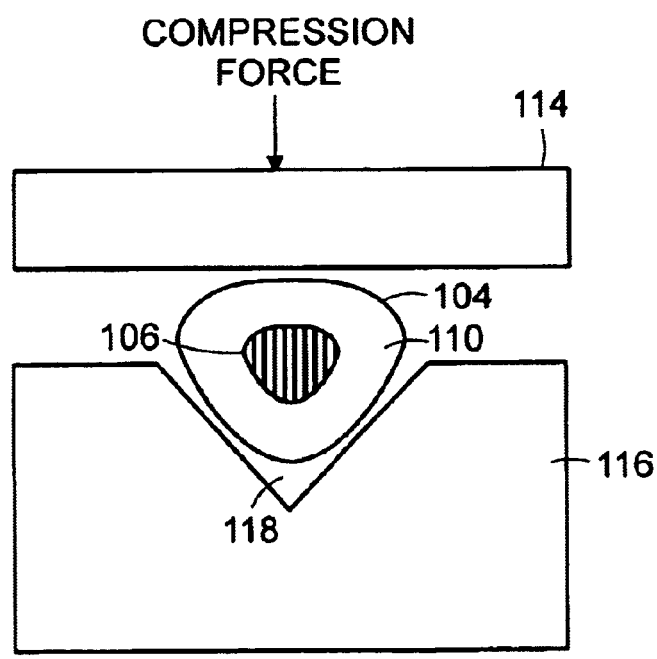
FIG. 4 is a cross-sectional end view of the optical fiber of FIG. 2, being compressed between a flat plate and a plate having a groove to create an approximately D-shaped core.

Tapered, compressed optical fiber 104 may also have an approximately D-shaped fiber core 106. The D-shaped fiber core 106 may be made by compressing an optical fiber 104 between flat plate 114 and a plate 116 having a groove 118 (e.g. a V-groove) as shown in FIG. 4. The plate 114 and plate 16 may be constructed of a material that does not adhere to glass at high temperature, such as glassy carbon, graphite, or boron nitride.

Figure 5:
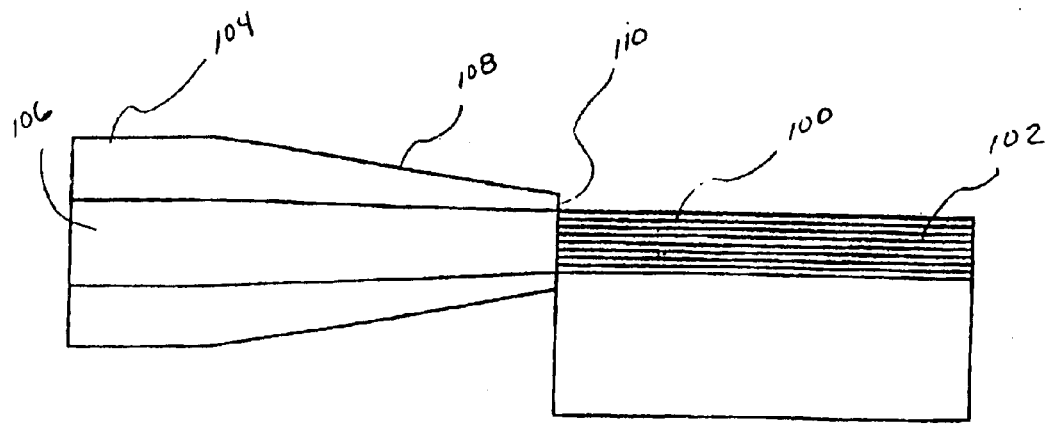
FIG. 5 is a side view of the optical fiber of FIG. 2 butt-coupled to a diffused waveguide.

Referring to FIG. 5, when in use the optical fiber 104 may be butt-coupled to a diffused waveguide 100.

Figure 6:
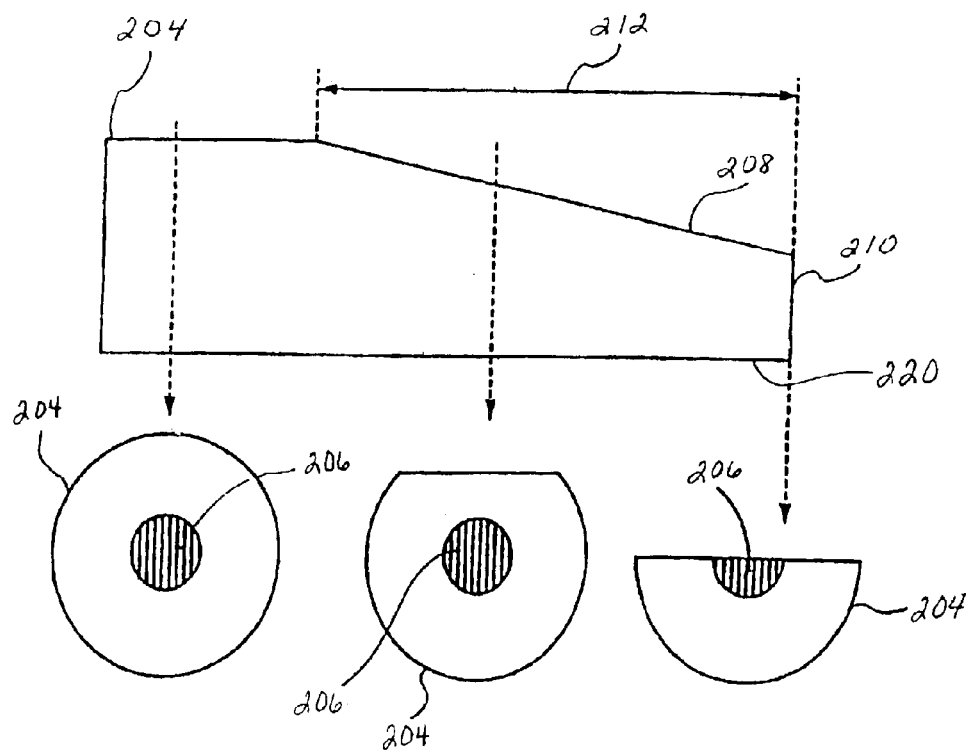
FIG. 6 is a side view with cross-sectional views of an optical fiber having a tapered end section and a D-shaped core located at the end of the fiber, in accordance with a second embodiment.
Figure 7:
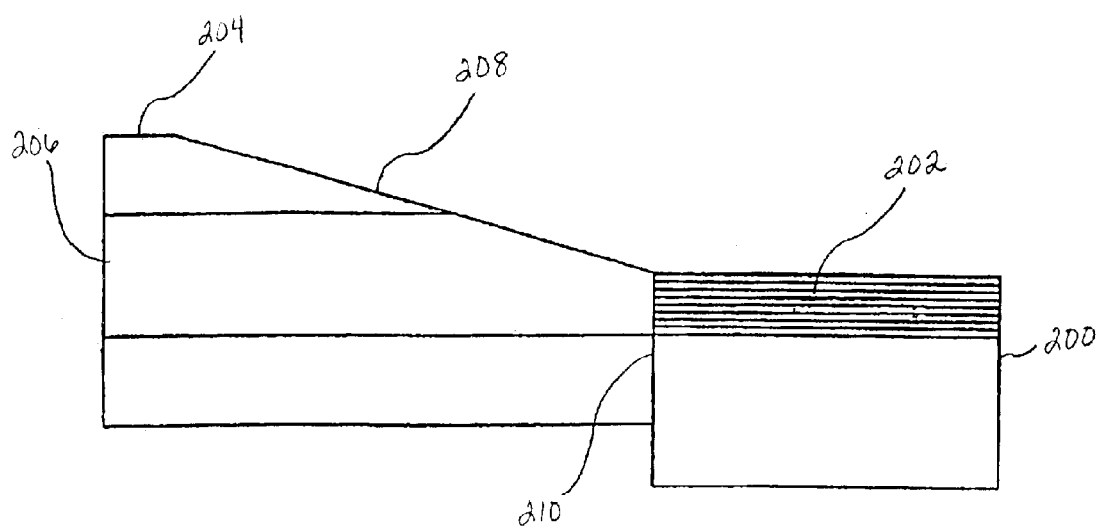
FIG. 7 is a side view of the optical fiber of FIG. 6 butt-coupled to a diffused waveguide.

Referring to FIG. 6, a second embodiment is shown. An optical fiber 204 is polished/lapped on one side so that a portion of the fiber core 206 is removed and such that the remaining portion of the fiber core 206 is approximately D-shaped. The D-shaped fiber core 206 is located at an end 220 of the optical fiber 204. The D-shaped fiber core 206 provides improved coupling to a diffused waveguide 100. The optical fiber 204 shown in FIG. 6 may be made by lapping the side of the optical fiber 204 at a very small angle, such as 0.01 to 2 degrees, which is typically much less than 1 degree, and the taper length 212 should be made long enough so that the optical fiber 204 provides for an adiabatic mode shape conversion. Thus, the D-shaped fiber core 206 provides for reduced coupling losses when coupled to a diffused waveguide 100. For example, in use the optical fiber 104 may be butt-coupled to diffused waveguide 100 as shown in FIG. 7.

It will be clear to one skilled in the art that the above embodiments may be altered in many ways without departing from the scope of the invention. Accordingly, the scope of the invention should be determined by the following claims and their legal equivalents.

What is claimed is:

1. An optical for coupling to a waveguide, comprising:
   an optical core comprising a large-width section of a first width and a small-width end section of relatively smaller width;
   a core taper section extending between the large-width core section and the small-width core end section, the taper dimensioned to provide a gradual transition between the large-width and small-width core sections to permit adiabatic mode transformation between the large-width and small-width core sections, wherein the taper section includes a sidewall inclined at an angle in the range of 0.01 to 5 degrees relative to the fiber axis; and
   a core endface at the small-width core section, the core endface having a non-circular cross-sectional shape in a plane perpendicular to the core axis.

2. The optical fiber of claim 1 wherein the taper section includes a sidewall inclined at an angle in the range of 0.1 to 2 degrees relative to the fiber axis.

3. An optical fiber for coupling to a waveguide, comprising:
   an optical core comprising a large-width section of a first width and a small-width end section of relatively smaller width;
   a core taper section extending between the large-width core section and the small-width core end section, the taper dimensioned to provide a gradual transition between the large-width and small-width core sections to permit adiabatic mode transformation between the large-width and small-width core sections, wherein the taper section extends over a length in the range of 100–10000 microns; and
   a core endface at the small-width core section, the core endface having a non-circular cross-sectional shape in a plane perpendicular to the core axis.

4. The optical fiber of claim 3 wherein the taper section extends over a length in the range of 300–3000 microns.

5. The optical fiber of claim 3, wherein the taper section comprises a compressed core segment.

6. The optical fiber of claim 3, wherein the taper section comprises a polished core segment.

7. The optical fiber of claim 3, wherein the core endface comprises a non-rectangular cross-sectional shape.

8. The optical fiber of claim 7, wherein the core endface comprises an oval cross-sectional shape in a plane perpendicular to the core axis.

9. An optical waveguide device comprising:
   an optical fiber comprising:
      an optical core comprising a large-width section of a first width and a small-width end section of relatively smaller width;
      a core taper section extending between the large-width core section and the small-width core end section, the taper dimensioned to provide a gradual transition between the large-width and small-width core sections to permit adiabatic mode transformation between the large-width and small-width core sections, wherein the taper section extends over a length in the range of 100–10000 microns; and
      a core endface at the small-width core section, the core endface having a non-circular cross-sectional shape in a plane perpendicular to the core axis; and
   a diffused optical waveguide optically coupled to the optical fiber at the fiber core endface.

10. An optical waveguide device comprising:
    an optical fiber comprising:
       an optical core comprising a large-width section of a first width and a small-width end section of relatively smaller width;
       a core taper section extending between the large-width core section and the small-width core end section, the taper dimensioned to provide a gradual transition between the large-width and small-width core sections to permit adiabatic mode transformation between the large-width and small-width core sections, wherein the taper section includes a sidewall inclined at an angle in the range of 0.01 to 5 degrees relative to the fiber axis; and
       a core endface at the small-width core section, the core endface having a non-circular cross-sectional shape in a plane perpendicular to the core axis; and
    a diffused optical waveguide optically coupled to the optical fiber at the fiber core endface.

11. The optical fiber of claim 10, wherein the taper section includes a sidewall inclined at an angle in the range of 0.1 to 2 degrees relative to the fiber axis.

12. The optical waveguide device of claim 9 wherein the taper section extends over a length in the range of 300–3000 microns.

13. The optical waveguide device of claim 9, wherein the taper section comprises a compressed core segment.

14. The optical waveguide device of claim 9, wherein the taper section comprises a polished core segment.

15. The optical waveguide device of claim 9, wherein the core endface comprises a non-rectangular cross-sectional shape.

16. The optical waveguide device of claim 15, wherein the core endface comprises a D-shaped cross-sectional shape in a plane perpendicular to the core axis.

17. The optical waveguide device of claim 15, wherein the core endface comprises an oval cross-sectional shape in a plane perpendicular to the core axis.

18. The optical fiber of claim 7, wherein the core endface comprises a D-shaped cross-sectional shape in a plane perpendicular to the core axis.

* * * * *